(12) United States Patent
Siemens et al.

(10) Patent No.: US 8,185,770 B2
(45) Date of Patent: May 22, 2012

(54) METHOD FOR PROCESSING TIME VALUES IN A COMPUTER OR PROGRAMMABLE MACHINE

(75) Inventors: Eduard Siemens, Sehnde (DE); Frank Glaeser, Hannover (DE); Jens Brocke, Laatzen (DE); Stefan Kubsch, Hohnhorst (DE); Ralf Koehler, Hannover (DE); Andreas Matthias Aust, Hannover (DE)

(73) Assignee: Tixel GmbH, Hannover (DE)

( * ) Notice: Subject to any disclaimer, the term of this patent is extended or adjusted under 35 U.S.C. 154(b) by 625 days.

(21) Appl. No.: 12/322,307

(22) Filed: Jan. 30, 2009

(65) Prior Publication Data

US 2009/0193282 A1 Jul. 30, 2009

(30) Foreign Application Priority Data

Jan. 30, 2008 (EP) .................................... 08101116

(51) Int. Cl.
*G06F 1/14* (2006.01)
(52) U.S. Cl. ............................. 713/500; 368/46; 368/47
(58) Field of Classification Search .................. 713/500; 368/46, 47
See application file for complete search history.

(56) References Cited

U.S. PATENT DOCUMENTS

| | | | | |
|---|---|---|---|---|
| 6,980,959 B1* | 12/2005 | Garrow et al. | ............... | 705/7.21 |
| 7,016,917 B2* | 3/2006 | Schreiber | ...................... | 707/812 |
| 7,400,656 B2* | 7/2008 | Koguchi | ........................ | 370/516 |
| 7,715,279 B2* | 5/2010 | Urano et al. | ..................... | 368/47 |
| 7,941,817 B2* | 5/2011 | Khusheim | ....................... | 725/32 |
| 7,949,890 B2* | 5/2011 | Vonog et al. | ................... | 713/400 |
| 7,987,108 B2* | 7/2011 | Wetzer et al. | ................. | 705/7.12 |
| 2003/0081507 A1* | 5/2003 | Kitazawa | ........................ | 368/21 |
| 2008/0129537 A1* | 6/2008 | Osterloh et al. | .......... | 340/870.02 |

OTHER PUBLICATIONS

Microsoft, DateTime Properties, Nov. 29, 2006, pp. 1-2, XP002486245.
Microsoft, DateTime.Kind Property, Nov. 29, 2006, pp. 1-5, XP002486246.
Microsoft, .Net Framework 2.0 Software Development Kit, Nov. 29, 2008, pp. 1-3, XP002486247.
Tannenbaum, Andrew S., Operating Systems: Design and Implementation, 1987, pp. 155-156, XP002486248.
European Search Report dated Jul. 15, 2008.

* cited by examiner

*Primary Examiner* — Kim Huynh
*Assistant Examiner* — Zahid Choudhury
(74) *Attorney, Agent, or Firm* — Howard IP Law Group, PC

(57) ABSTRACT

Modern computers (10, 20) come with different timers having different attributes like time resolution, supported time range and time reference. Some are local timers, representing relative time values like the TSC counter (11, 21) counting CPU cycles from the power on or reset of the computer. Some are global timers, representing an absolute or real time. Having different classes of timers in the computer (10, 20), a number of computations need to be performed to tie the different timers to each other.
It is the idea of the invention to define a single high resolution timer structure wherein the time value is represented with a digital number and a flag clarifies whether the timer is a global timer or local timer. The invention enables a much faster processing of the time values. The global time, tied to a high-resolution timer can be tracked much faster. This means better precision of scheduling of time critical jobs, like packet scheduling for data transport.

6 Claims, 1 Drawing Sheet

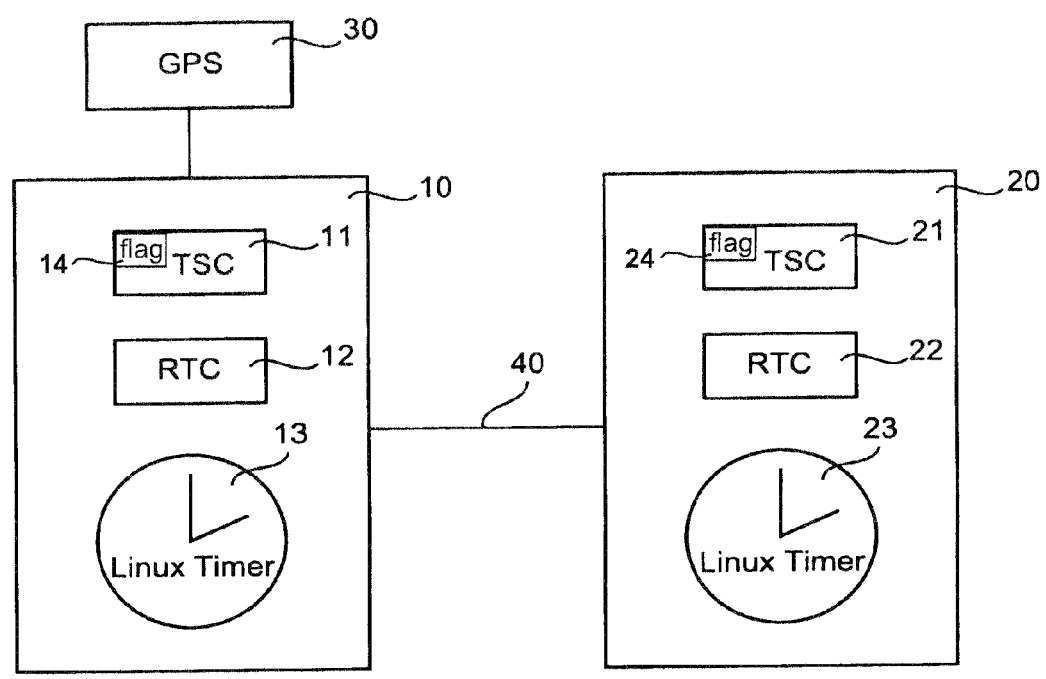

METHOD FOR PROCESSING TIME VALUES IN A COMPUTER OR PROGRAMMABLE MACHINE

This application claims the benefit, under 35 U.S.C. §119 of European Patent Application No. 08101116.5, filed Jan. 30, 2008.

FIELD OF THE INVENTION

The invention relates to the technical field of processing time values in a computer or programmable machine. A computer or programmable machine is usually equipped with a number of different time keeping circuits or software functions (timers) with different attributes, in particular precision, represented time range and time reference value.

BACKGROUND OF THE INVENTION

Time tracking and time computation is essential within computer and communication systems.

Scheduling of resources is normally based on time computations. Time measurements are needed quite often. E.g. figuring out what the exact transfer time is when sending a data packet from one computer to another over a data network is needed for filling the transmission buffer in the sender in optimized fashion. If this time is measured with great accuracy, the transfer rate may even be increased. Another example is optimizing program code on a computer. The execution times of different codes must be known with high precision in order to find the optimized code.

The main attributes of a timer data structure for processing in a computer are resolution, reference time and the timer range. Resolution means the smallest positive time difference between two non-equal time values. The reference time means the point in time at which the time count is started. Range means the range between the smallest and the biggest possible time value. The range is usually limited by the size of the data structure (or register) the value is stored in. However, in modern computing systems, different time systems simultaneously deal with different kinds of timers, with different resolution, reference time and range.

On many Unix-based systems, the main time in user space counts elapsed seconds since 1st of Jan. 1970. The time range is $2^{32}-1$ seconds. The MS-Windows' main application time is counted in milliseconds since 1 st Jan. 1900.

However, some other time systems with much higher resolutions, supported by hardware, are available on many systems. For instance, the TSC counter (Time Stamp Counter) that counts each CPU cycle from the computer power on, is available on PC platforms based on Intel 80×86 CPU's. CPU cycle time corresponds to the clock period of the clock signal a CPU is clocked. Although the TSC counter on Personal Computer platforms is implemented as a 64 bit register, it may be a disadvantage that the TSC counter could wrap around within some years, with the given high CPU frequencies of more than 3 GHz in modern computer systems. Of course, the TSC counter is reset each time after power on and system reset, so that it is not very likely that the maximum value will be reached. E.g. the TSC timer in a CPU clocked at a speed of 3 GHz can time events that span up to 194 years.

The other disadvantage of high-resolution counters, like the TSC counter, is the local validity of such counters. If two or more computing systems are independently operated, it is difficult to compare the time counted by TSC counters of the different systems. In network or communication systems it is however needed to monitor the data flow and processing stages with high time resolution.

SUMMARY OF THE INVENTION

The invention deals with the problem of defining and implementing an efficient algebra for computations with the timer values from different timers having different attributes like timer range, resolution and reference time. These computations particularly include calculating sums and difference values of such timer values. The algebra helps to compare clocks with high precision and reduced computation expenditure.

The invention resides in a method for processing time values in a computer or programmable machine as claimed in claim 1. The invention also concerns an apparatus for performing the method as claimed in claim 7 and a computer program product as claimed in claim 8.

According to the invention a high precision timer data structure is defined consisting of at least a digital number for the time value plus a flag clarifying whether the timer is representing an absolute or real time, called global timer or a relative time, called local timer. A timer will get a global timer status if the time value is representing an absolute or real time value. For instance the Unix main time and MS Windows application time both fall under the category global timer. A timer has the attribute of being a local timer if the time value represents a relative elapsed time without reference to an absolute or real time value, so e.g. the TSC timer is a typical local timer.

The definition of the high precision timer class helps a lot to reduce the required processing power of the CPU for updating the timer data structure. While according to the classical timer data structure the high resolution and low resolution related members of the structure must be synchronized each time the timer structure will be updated, the definition of one high precision timer data structure according the invention proposes a simplified approach of time synchronization between two timer systems with different time scales and different resolutions.

Computations (calculating sums and differences of times) with the mentioned timer structures with flag assignment, incorporating two different time systems, will then be performed more efficiently. Since the computations with the timer values will execute much faster, on time-critical systems, the global time, tied to a high-resolution timer can be tracked. By this means better precision of scheduling of time critical jobs (e.g., packet scheduling) can be achieved. Due to the intensive timer calculation load in network stacks an efficient timer calculation method is crucial. In consequence the data packet transfer rate can be increased on high speed networks with the inventive method.

Further advantageous embodiments are apparent from the dependent claims. For calculating time differences or time sums, it is particularly advantageous, if the time values will be subtracted or added and the flags will be combined in a logical operation to get the entry in the flag for the resulting value. These logical or Boolean operations perform very fast and can have hardware support.

A logical OR operation is advantageous for the addition of time values and a logical XOR operation is advantageous for a subtraction of time values.

BRIEF DESCRIPTION OF THE DRAWINGS

An embodiment of the invention is depicted in the drawings and will be explained hereinafter. The drawing shows in a figure two computers connected to each other by means of a network cable, equipped with a number of different timers.

DETAILED DESCRIPTION OF THE INVENTION

FIG. 1 shows two computers 10, 20 being connected to each other via a LAN cable 40 for data communication. The computers can be powerful workstations normal PC's or a one-chip-PC as an example. The network, to which the computers 10, 20 are attached, can be a high speed network. High speed networks are more and more available not only in video production sites, such as film or TV studios, but also in wide area distribution networks. Prominent examples are 10 G Ethernet or Infiniband. The requirements for such a network are e.g. but not exhaustive:

Packetized Data Transport
Low Latency
Synchronisation Information like Audio-Video Time Stamps included
Multiplexing of Video and related Audio Content
Robustness Against Errors—Bit Errors shall not be visible to Upper Layers
Easy Support by Hardware Building Blocks
Support of Metadata (e.g. Time, Audio, Video, Camera Parameters)

In studios, professional video networking means that the video content is transferred uncompressed. For HD quality, in 2 k (2048*1080 pixels) resolution a video stream with a net data rate of 1.59 Gbit/s is resulting in case of 24 frames per second and 3*10 bit colour depth. Even higher data rates are resulting for 4 k resolution (4096* 2160 pixels). For HDTV formats 1080 i/720 p data rates from 250 to 300 Mbit/s are resulting in studio environment (uncompressed). This shows, what high speed networking means in this case.

For timing events and measuring time spans, modern computer systems are equipped with a number of different timers and counters and clocks. Some of the common timers and limitations will be discussed now:

First of all, there is a built-in Real Time Clock (RTC) in a PC. The clock is battery powered and also running if the PC is in power down mode. Date and time can be read out, here, but not with high precision. It is only about +/−1 s/day.

There is a function in C programming language which is called "time( )". For measuring a time period, the function will be called before and after the start and stop event and calculating the difference will give the time it took between the two events. The accuracy of this timer is about a +/−1 s. This timer can time events that last up to 79 years.

For events that need higher accuracy, the multimedia timer can be used. The name of the function is timeGetTime. This timer is used in the same way as the C runtime function, calling the function timeGetTime. This timer has an accuracy of +/−10 ms and can handle events that last up to 49 days.

Utilizing the processor clock provides for even higher precision. On a system with a 3 GHz processor, this timer can measure events that last less than one nanosecond. The timer is called TSC timer (Time Stamp Counter) and the accuracy of this timer on a 3 GHz system is +/−0.333 nanoseconds. This timer, however, cannot be directly accessed using a high level language. It can only be called using the assembler instruction Read Time Stamp Counter (RDTSC). Depending on how the time values are stored, this timer can handle events that can last a very long time. For example, if the time value is stored as a 32-bit value, this timer can measure an event that only runs up to 1.432 seconds. However, if the time is returned as a 64-bit value, it can time an event that spans up to 194 years.

Using this timer one should be aware of one drawback. For example, laptops using Intel® Pentium® II Processors and later have Intel Speedstep Technology built in it. Likewise, AMD processors Athlon 64, or Turion 64 use a technology called Cool'n'Quiet or PowerNow. While these technologies are good for conserving power when laptops are running on batteries, it changes the processor frequency. If the frequency changes while the targeted code is running, the final reading will be redundant since the initial and final readings were not taken using the same clock frequency. The number of clock ticks that occurred during this time will be accurate, but the elapsed time will be an unknown.

There is another timer existing called Enhanced Timer (Etimer) which is based on two Windows* API functions; QueryPerformanceCounter and QueryPerformanceFrequency. There is no way to know which frequency is utilized to implement those two functions on any given platform. But one thing for sure is that the frequency of that timer will never change during the course of timing. The timer can be either the chipset timer or the power management timer or something else. The Etimer is created to meet two goals: first, it can be used as a high precision timer which is accurate to nanoseconds and second it is independent of Speedstep technology or similar technologies. The OS will check to see if the system has a high performance clock built-in. If it has and the system has no energy saving mechanism this timer will take advantage of this clock, which is most likely the processor clock. Otherwise, the timer will use another constant frequency clock like the chipset, BIOS or the power management timer. There are things to consider when using this timer in applications. Since the Etimer uses the system calls QueryPerformanceCounter and QueryPerformanceFrequency, it will incur an overhead associated with system calls. The Etimer also has another overhead associated with the checking mechanism that ensures that all the measurements are taken on the same processor. If the overhead is too much for an application, it is recommended to use the processor clock by calling the instruction RDTSC.

In Unix-based systems there is a clock called Unix time or POSIX time that counts elapsed seconds since $1^{st}$ of January 1970, 00:00:00 UTC. The time range is $2^{32}-1$ second. A UTC day mostly lasts exactly 86400s. The PC will calculate the respective value based on a time reference value provided by a real time clock, e.g. the RTC clock or if more accurate clocks are available, then they will be used. Examples of more accurate clocks are e.g. a GPS clock or National Bureau of Standards clock or similar services, e.g. the time service from the Physikalische Technische Bundesanstalt in Braunschweig.

In MS Windows is the main application time available counted in milliseconds since $1^{st}$ of Jan. 1900.

In a Linux OS, the function call gettimeofday delivers the Unix time value in a 32 bit integer for the seconds and the amount of microseconds in another 32 bit unsigned integer. This is an extension of the Unix time mentioned above.

In the listing above, the global scope timers are the Real Time Clock RTC, the GPS, NBS or PTB time, the Unix main time, and the MS Windows main application time. All the others are local timers not being representative of an absolute or real time.

The two computers shown in FIG. 1 are equipped with TSC timer 11 and 21, RTC timer 12 and 22 and Linux timers 13 and 23. Computer 10 is also connected to an external GPS timer 30 and thus has the more accurate real time clock on board. The existing network time protocol NTP will be used to synchronize the clocks inside the computer 20 to the GPS timer 30.

For comparing time instants with high accuracy in different workstations or PC's, the favorable solution is the combination of a global-scope timer like the Unix system time in seconds or MS Windows system time in milliseconds with one high-resolution timer like the TSC counter. One feasible solution to bring together a (local scope) high resolution timer with a timer of global scope is often implemented as follows.

During initialization of the timer system the global clock (Unix time) must be synchronized to the local scope clock (TSC). The standard Unix time (data type representing a point in time) is a signed integer data type, traditionally of 32 bits, directly encoding the Unix time number as described in the preceding section. Being integer means that it has a resolution of one second; many Unix applications therefore handle time only to that resolution. Being 32 bits (of which one bit is the sign bit) means that it covers a range of about 136 years in total. The minimum representable time is 1901-12-13T20:45:52 Z, and the maximum representable time is 2038-01-19T03:14:07 Z. At 2038-01-19T03:14:08 Z this representation will overflow.

In a Linux OS, the function call gettimeofday delivers the Unix time value in a 32 bit integer for the seconds and the amount of microseconds in another 32 bit unsigned integer.

For comparing the time values in different computers, the scale factor between the two timers TSC_per_microsecond must be determined. That can be performed, e.g., empirically. Of course the knowledge of the frequency of the CPU clock is needed for this purpose. There is a function call GetFrequency provided in an operating system like Linux or MS Windows. E.g. MS Windows provides a so called Enhanced Timer (Etimer) based on the Windows API functions QueryPerformanceCounter and QueryPerformanceFrequency. When the frequency is known, the number of signal periods within a microsecond reflects the value TSC_per_microsecond. In one implementation the TSC_per_microsecond values might be provided in a table for all the possible CPU clocks. After having determined the CPU clock frequency, the corresponding TSC_per_microsecond value will be read out of the table. This avoids time consuming calculations to determine the value.

After that, the two numbers zeroTSC_seconds and zeroTSC_microseconds for the seconds and microseconds in Unix time when the TSC counter was reset would be set.

Each time the value of one component of the timer data structure will be updated, the high resolution (TSC) and low resolution (seconds, microseconds) related members of the structure must be synchronized to each other.

An implementation of the timer class in C++ programming language is given hereinafter:

```
Class Timer {
int32 seconds;
uint32 microseconds;
int64 TSC;
public:
Timer( );
private:
static uint32 zeroTSC_second;
static uint32 zeroTSC_microseconds;
static uint32 TSC_per_microsecond;
...
}
```

With each timer data structure update, at least one addition or subtraction and one scaling (multiplication or division) operation must be performed to tie the high-resolution and low resolution parts to each other.

Provided, for two timer objects Time1 and Time2, the high resolution components (TSC) are fetched by means, described above, the following calculation steps are necessary for getting each timer object in synchronization:

0) Time1.TSC=RDTSC
1) Time1.seconds=zeroTSC_seconds+ Time1.TSC/1000000/TSC_per)microsecond
2) Time1.microseconds=zeroTSC_microseconds + Time1.TSC/TSC_per_microsecond
3) Time1.seconds+=Time1.microseconds /1000000
4) Time1.microseconds %=Time1.microseconds;

Same operations are necessary for the second object.

Step 0) corresponds to the reading of the TSC counter. As shown, a couple of additions and divisions are needed according to the conventional method. Only after syncronization of high- and low-resolution components of the class, two timers can be compared. However in high-end communication systems such operations must usually be performed once or several times per microsecond, which can be an issue within time critical systems. So it is desirable to simplify this synchronization of time bases. Hereinafter a more efficient method for use of two time systems with a different resolution and a different reference point is proposed. According to the invention the number of members of the actual timer data structure is reduced to only the relevant ones for the system with higher resolution (TSC). The static members track the offset and scale factor between both time systems as usual.

These static members will be calculated and set during initialization of the timer system. Instead of the remaining members described above, one Boolean variable called global_timer flag is introduced here. This flag has reference number 14 for the TSC timer 11 and reference number 24 for the TSC timer 21 in FIG. 1. Now, the Timer data structure is a different one as shown below:

```
Class Timer {
int64 TSC;
bool global_timer;
public:
Timer( );
private:
static uint32 zeroTSC_second;
static uint32 zeroTSC_microseconds;
static uint32 TSC_per_microsecond;
}.
```

We consider the timer as a global timer (standing for an absolute or real time), if it is set to the global time (i.e., seconds and microseconds since 01.01.1970 for Unix or Linux and seconds and milliseconds since 01.01 1900 for MS Windows). Since we have only the TSC variable to store the time, the seconds and microseconds must be scaled to the TSC resolution like in the following formula:

TSC=((seconds*1000000+microseconds)*

TSC_per_microsecond.

In this case, the global_timer flag must be set to true. This operation consumes approximately the same time as each conversion between the two time systems according to the conventional method as explained above. However, the low resolution timer with the seconds and microseconds components is used less frequently than the high resolution TSC based timer component. Moreover, the required accuracy of the low resolution timer is less than the one of the high resolution timer. So the deviation from the exact value is below the resolution in microseconds while the same kind of calculation in TSC resolution is more critical. Note that approximately the same amount of instructions are required in both cases.

If a timer is set to the high resolution timer, it is a member of the TSC timer data structure but the global_timer flag is set to false. The meaning of such a timer is described as local timer (relative time).

On actual systems, the wrap around of the TSC timer will occur some 100 years after the reference time point (if it is calculated as described above). If this can be an issue, the members of seconds and microseconds must be still present within the new data structure. However, dependant on the meaning of the timer (local or global, see below) the TSC member or seconds and microseconds members will be in effect. This will cause some performance penalty for the proposed method, but still be faster than the conventional method.

Besides the assignment of a class to the timer, the most performance critical operations with timer structures are additions and subtractions.

With each assignment operation for the class of timers as defined above, as well as with an addition and subtraction, only the TSC value must be set or recalculated; this means an assignment to the TSC member, or an addition or subtraction of TSC members, respectively. Additionally, the global_timer flag, representing the meaning of the result value, must be set to as follows:
a) On the assignment operation, which is an operation in a programming language, the new timer inherits the meaning of the assigned value. So here, the attribute global or local will be inherited from the assignor.
b) On addition of two timers, the resulting global_timer flag is the result of a logical OR operation of the flags of both terms.

| Operand 1 | Operand 2 | Result |
|---|---|---|
| local | Local | local |
| local | Global | global |
| global | Local | global |
| global | Global | global |

An example for the addition of a local and global timer value is given below:
24:00:00Z+2008-01-25T16:25:00Z=2008-01-26T16:25:00z Evidently, a global timer value is resulting.

The operation in the last row of the table above doesn't make sense in each context. However, mathematically, it is correct and can be used for some common calculations. One case of usage of that operation might be the computation of a global mean time of the arrival of some events. For this computation, a number of global timers must be added and the result be divided by the number of timers.
c) On subtraction of two timers, the resulting global_timer flag is the result of an XOR operation of both terms.

| Operand 1 | Operand 2 | Result |
|---|---|---|
| global | global | local |
| Local | global | global |
| Global | local | global |
| Local | local | local |

One example is given below:
24:00:00Z−2008-01-25T16:25:00Z=−2008-01-24T16:25:00Z In this case the time value form the global timer is negative. At a first glance it does not make sense physically. However, for performance reason, in an ALU of a processor those negative time values are often used. Moreover it is faster to calculate with such negative values and invert them afterwards than to interchange time parameters.

The XOR and OR operations, used for calculation of the meaning of a timer, are much faster than one integer addition/subtraction and one multiplication/division, used to convert one timer data structure to the other one. Moreover, XOR and OR operations can be implemented in hardware, using a few gates, so this method of timer calculation will be performed much faster than the conventional method.

Typical applications where time values need to be added, substracted or compared are:
Calculation of Round trip Times RTT or One way Delays for transferring data packets over data networks, configuration management, motor control, and automation control techniques.

The above specification, examples and drawings provide a complete description of the manufacture and use of the composition of the invention. Since many embodiments of the invention can be made without departing from the spirit and scope of the invention, the invention resides in the claims herein after appended. The method according the invention can be implemented with software means or hardware means.

What is claimed is:

1. A method for processing time values in a computer or programmable machine, comprising:
defining, in a processor, a high precision timer data comprising at least a digital number and a Boolean flag for each time value, the Boolean flag clarifying whether the timer is representing an absolute or real time herein after called global timer, or if the timer is representing a relative time, herein after called local timer; and
computing, in the processor, of two time values from the high precision timer data structure, the computing comprising an addition or subtraction operation of the digital numbers and a logical operation of the Boolean flags;
wherein:
on a condition that the two time values are added, the time values are added and the Boolean flags are combined in a logical OR operation to determine a flag value for the resulting value, or
on a condition that the two time values are subtracted, the time values are subtracted and the Boolean flags are combined in a logical XOR operation to determine the flag value for the resulting value;
and wherein the global timer flag is dominant and the local timer flag is recessive.

2. The method according to claim 1, wherein the global timer representing an absolute or real time value has a meaning with a concrete date and time and wherein the local timer representing a relative time has no association to a concrete date and time.

3. The method according to claim 1, wherein the digital number for the time value corresponds to an integer value that has a bit length sufficient to represent a counter value from a time stamp counter TSC of a CPU.

4. The method according to claim 3, wherein the integer value is a 64-bit integer.

5. An apparatus having a CPU, adapted to perform a method according to claim 1.

6. A computer program product embodied in a CPU, adapted to perform a method according to claim 1, when run in a computer or programmable machine.

* * * * *